No. 643,512. Patented Feb. 13, 1900.
W. L. LUBBOCK.
NAIL PULLER.
(Application filed Nov. 24, 1899.)
(No Model.)
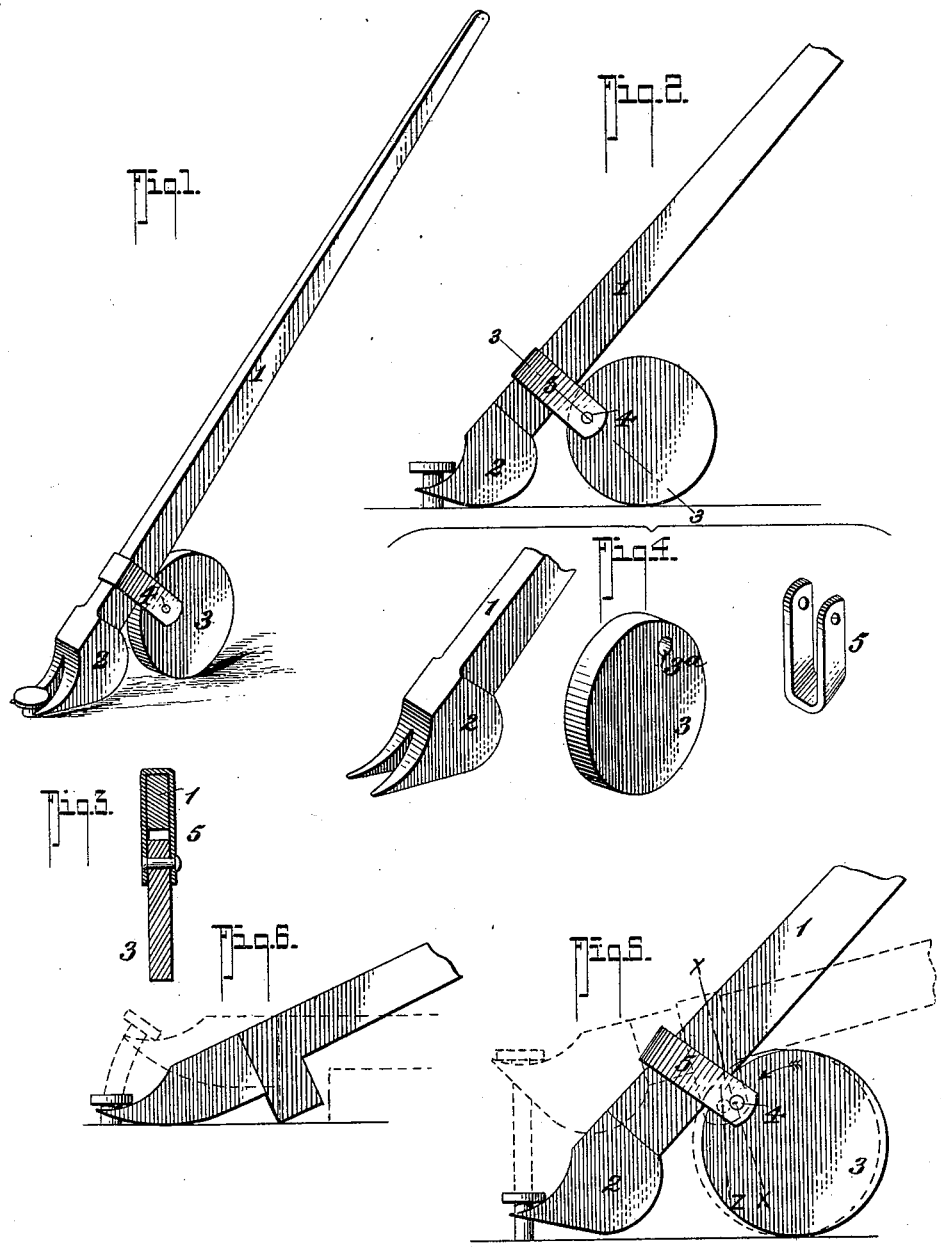
WITNESSES:
Louis Dieterich
John E. Burch
INVENTOR
Wm L. Lubbock
BY
Fred G. Dieterich & Co
ATTORNEYS

UNITED STATES PATENT OFFICE.

WILLIAM LOCKHART LUBBOCK, OF RUSK, TEXAS.

NAIL-PULLER.

SPECIFICATION forming part of Letters Patent No. 643,512, dated February 13, 1900.

Application filed November 24, 1899. Serial No. 738,210. (No model.)

*To all whom it may concern:*

Be it known that I, WILLIAM LOCKHART LUBBOCK, residing at Rusk, in the county of Cherokee and State of Texas, have invented a new and Improved Nail-Puller, of which the following is a specification.

This invention relates to that class of nail or spike pullers embodying a long lever having an extracting-claw at the lower end and equipped with fulcrum devices whereby the leverage of the said lever can be adjusted; and primarily this invention has for its purpose to provide an implement of this character, of a very simple and economical construction, which can be conveniently manipulated and which will readily serve for its intended purposes.

This invention consists in certain details of construction and peculiar combination of parts, all of which will hereinafter be fully described, and specifically pointed out in the appended claims, reference being had to the accompanying drawings, in which—

Figure 1 is a perspective view illustrating my invention as in use. Fig. 2 is a side elevation of the same, showing the manner in which the fulcrum-roller acts as a wedge for forcing the claw of the lever forward. Fig. 3 is a cross-section on the line 3 3 of Fig. 2. Fig. 4 is a detail view of the claw-lever, the fulcrum-roller, and the securing-bail for the fulcrum-roller. Figs. 5 and 6 are diagrammatic views hereinafter specifically referred to.

In the accompanying drawings, in which like numerals indicate like parts in all the views, 1 indicates the claw-lever, which may be of the ordinary form; but I prefer to make the body portion square or rectangular shape to facilitate the sliding of the fulcrum device attached thereto and presently referred to, the lower end of said lever terminating in a claw-head 2, which may also be of the ordinary form.

The essential feature of my invention lies in the peculiar construction of the fulcrum member and the manner of detachably and adjustably connecting it with the lever.

The fulcrum in my form of implement consists of a solid disk or wheel 3, preferably of the same thickness as the width of the lever. The wheel 3 is provided with an eccentrically-disposed aperture $3^a$, preferably near its peripheral edge, for the reception of the pivot-pin 4, that serves to hold the said wheel-fulcrum between the pendent ends $5^a$ of the U-shaped strap or bail 5, held to freely slide upon the lever 1.

It will be noticed by reference to Fig. 3 that the bail 5 is open at the bottom and is of a greater length than the width of the lever 1, such construction having a twofold purpose. First, it provides against the said bail binding against the lever when it is desired to slide the same thereon, and, secondly, it also provides for suspending the wheel 3 some distance from the back edge of the lever, whereby to admit of freely detaching the fulcrum device from the handle or fitting it thereon, and, furthermore, providing for a free and quick-sliding adjustment of the fulcrum of the said handle when it is desired to change the leverage-power of the implement by shifting the fulcrum, it being obvious that such sliding movement can be easily effected, as under no conditions will the bail 4 tightly bind against the lever.

So far as described it will be readily seen that the fulcrum of the lever can be adjusted by sliding the same thereon to or from the claw end as the multifarious operations of the lever may make necessary.

I am aware that slidable fulcrum members having levers have heretofore been provided; but so far as I know such members after being adjusted or slid to the desired points upon the lever produce, as it were, fixed fulcrums, and inasmuch as the fulcrum-point when adjusted is a fixed one it follows that as pressure is applied to the outer end of the lever the claw end will be forced upward in an arc of a circle having as its center (see Fig. 6) the fulcrum-point. My invention differentiates from such forms of implements having adjustable fulcrums which when set act as a fixed axis for the lever in that my improved fulcrum after it has been set or adjusted automatically changes its position in such manner as to cause the claw to effect a more firm grip or bite upon the nail or spike with which it engages by forcing it in a forward direction in contradistinction to the rearward direction, as is the case when the fulcrum remains a fixed axial point, in my construction the fulcrum serving, as it were, to wedge the claw forward against the nail or spike, and thereby cause the claw to pull the nail or spike more straight than is possible with the other forms of pulls referred to.

It will be readily understood that in using my form of implement the fulcrum-wheel, with its bail 4, is moved back on the lever 1 to the point desired.

Now assuming the claw to have been pressed under the nail or spike head (see Fig. 5) the lever will rest upon the wheel 5 and not upon the bail 4, the fulcrum-point of the lever at this time being on the line indicated by X. Now applying pressure to the end of the lever will tend to rotate the fulcrum-wheel forwardly in the direction indicated by the arrow Y, which movement shifts the fulcrum-point forwardly approximately on the line indicated by Z, and in consequence correspondingly moves the claw-head forward to more firmly engage the spike or nail, such change of position gradually continuing as the nail or spike is pulled up until the wheel has been turned sufficiently to cause the bail 4 to tightly grip down against the front edge of the lever, after which the said wheel becomes a fixed fulcrum, it being obvious that if desired to still operate the implement under an automatic shifting fulcrum it will only be necessary to elevate the outer end of the lever slightly to permit the wheel and its bail being pushed forward by the foot.

By providing a fulcrum such as described the same can be quickly slid to the position desired upon the lever and all strain upon the bail that hauls it upon the lever is transferred directly to the fulcrum-wheel. Furthermore, the leverage-power is automatically increased after the fulcrum has been set to the desired position. Again, as the claw end is automatically pressed forward by the rotary action of the wheel 5 a positive and more powerful grip of the claws on the nail or spike is effected and the danger of the claw slipping from under the spike or nail head is reduced to a minimum.

Having thus described my invention, what I claim, and desire to secure by Letters Patent, is—

1. An implement for the purposes described, comprising a claw-lever; a bail slidably mounted upon the lever and a disk or wheel eccentrically journaled on the bail and disposed adjacent the rear edge of the lever.

2. The combination with the claw-lever; of the bail open at the lower end, said end being projected beyond the rear edge of the lever, and a disk or wheel eccentrically journaled in the projected end of the bail, said disk or wheel being disposed in a vertical plane with the lever.

3. A nail-puller, comprising a lever having a claw at the lower end; a U-shaped bail slidably hung on the lever, said bail having its side members projected beyond the rear edge of the lever; a pivot-pin supported in the said ends of the bail at a point beyond the rear edge of the lever; and a disk or wheel eccentrically journaled upon the said pin, all being arranged substantially as shown and for the purposes described.

WILLIAM LOCKHART LUBBOCK.

Witnesses:
A. S. BUSBY,
B. S. HANCOCK.